United States Patent
Mohan et al.

(10) Patent No.: US 7,342,917 B2
(45) Date of Patent: Mar. 11, 2008

(54) MULTIMEDIA PERSONALIZED CALL MANAGEMENT (MPCM)

(75) Inventors: Seshadri Mohan, Basking Ridge, NJ (US); Haiping Luo, Malden, MA (US); Zhongsu Fu, Wakefield, MA (US)

(73) Assignee: Comverse, Inc., Wakefield, MA (US)

( * ) Notice: Subject to any disclaimer, the term of this patent is extended or adjusted under 35 U.S.C. 154(b) by 1141 days.

(21) Appl. No.: 09/968,847

(22) Filed: Oct. 2, 2001

(65) Prior Publication Data

US 2003/0063590 A1    Apr. 3, 2003

(51) Int. Cl.
*H04L 12/66* (2006.01)
*H04M 3/42* (2006.01)

(52) U.S. Cl. .................. 370/352; 370/410; 370/389; 379/211.02

(58) Field of Classification Search .......... 370/259, 370/270, 271, 338, 352, 363, 371, 374, 395.1, 370/395.72, 468, 395.4, 392, 389, 401; 379/88.13, 379/88.14, 88.22, 88.23, 88.24, 88.25, 88.26, 379/93.09, 93.11, 211.02, 199, 201, 88.21; 709/227, 205

See application file for complete search history.

(56) References Cited

U.S. PATENT DOCUMENTS

| | | | |
|---|---|---|---|
| 5,040,171 A * | 8/1991 | Osaki | 370/232 |
| 5,394,445 A | 2/1995 | Ball et al. | 379/67 |
| 5,524,110 A | 6/1996 | Danneels et al. | 370/62 |
| 5,577,104 A | 11/1996 | Knuth et al. | 379/67 |
| 5,625,676 A | 4/1997 | Greco et al. | 379/88 |
| H1714 H | 3/1998 | Partridge, III | 348/14 |
| 5,751,791 A | 5/1998 | Chen et al. | 379/88 |
| 5,894,504 A | 4/1999 | Alfred et al. | 379/88.13 |
| 5,969,636 A | 10/1999 | Parvulescu et al. | 340/825.44 |

(Continued)

FOREIGN PATENT DOCUMENTS

WO    WO 00/30330    5/2000

OTHER PUBLICATIONS

"WAP 2.0 Technical White Paper", Wireless Application Protocol Forum Ltd., pp. 2-13 (Aug. 2001) [online] [retrieved on Sep. 20, 2001] Retrieved from the Internet <URL:http://www.wapforum.org>.

*Primary Examiner*—Hanh Nguyen
(74) *Attorney, Agent, or Firm*—Mintz, Levin, Cohn, Ferris, Glovsky and Popeo, PC

(57) ABSTRACT

The present invention provides methods and systems for managing a call based on multimedia data. According to one embodiment, the invention provides a method for managing a call. The method includes receiving first data related to a call sent by a calling party to a called party. In response to the first data, the method obtains from a database second data related to the call. At least one of the first data, the second data, and a combination of the first and second data includes multimedia data. The method manages the call based at least in part on the multimedia data. In another embodiment, the present invention provides a system for managing a call. The system includes: a database operative to store data associated with subscribers; and a MPCM service in communication with the database. The MPCM service has an interface for communicating over a network. The MPCM service receives over the network first data related to a call sent by a calling party to a called party. In response to the first data, the MPCM service obtains, from the database, second data related to the call. At least one of the first data, the second data, and a combination of the first and second data includes multimedia data. The MPCM service manages the call based at least in part on the multimedia data.

44 Claims, 12 Drawing Sheets

U.S. PATENT DOCUMENTS

| | | | |
|---|---|---|---|
| 5,974,449 A * | 10/1999 | Chang et al. | 709/206 |
| 6,021,428 A * | 2/2000 | Miloslavsky | 709/206 |
| 6,032,053 A | 2/2000 | Schroeder et al. | 455/553 |
| 6,038,296 A | 3/2000 | Brunson et al. | 379/100.11 |
| 6,122,347 A | 9/2000 | Borland | 379/70 |
| 6,215,860 B1 | 4/2001 | Johanson et al. | 379/88.28 |
| 6,215,993 B1 | 4/2001 | Ulveland | 455/415 |
| 6,226,362 B1 | 5/2001 | Gerszberg et al. | 379/88.13 |
| 6,233,318 B1 | 5/2001 | Picard et al. | 379/88.17 |
| 6,535,596 B1 * | 3/2003 | Frey et al. | 379/201.01 |
| 6,701,378 B1 * | 3/2004 | Gilhuly et al. | 709/249 |
| 6,779,020 B1 * | 8/2004 | Henrick | 709/206 |
| 6,798,786 B1 * | 9/2004 | Lo et al. | 370/468 |
| 6,937,713 B1 * | 8/2005 | Kung et al. | 379/211.02 |
| 6,954,790 B2 * | 10/2005 | Forslöw | 709/227 |
| 2001/0025280 A1 * | 9/2001 | Mandato et al. | 707/3 |
| 2002/0013827 A1 * | 1/2002 | Edstrom et al. | 709/219 |
| 2002/0087656 A1 * | 7/2002 | Gargiulo et al. | 709/217 |
| 2002/0188744 A1 * | 12/2002 | Mani | 709/231 |
| 2003/0023726 A1 * | 1/2003 | Rice et al. | 709/225 |
| 2005/0143136 A1 * | 6/2005 | Lev et al. | 455/566 |

* cited by examiner

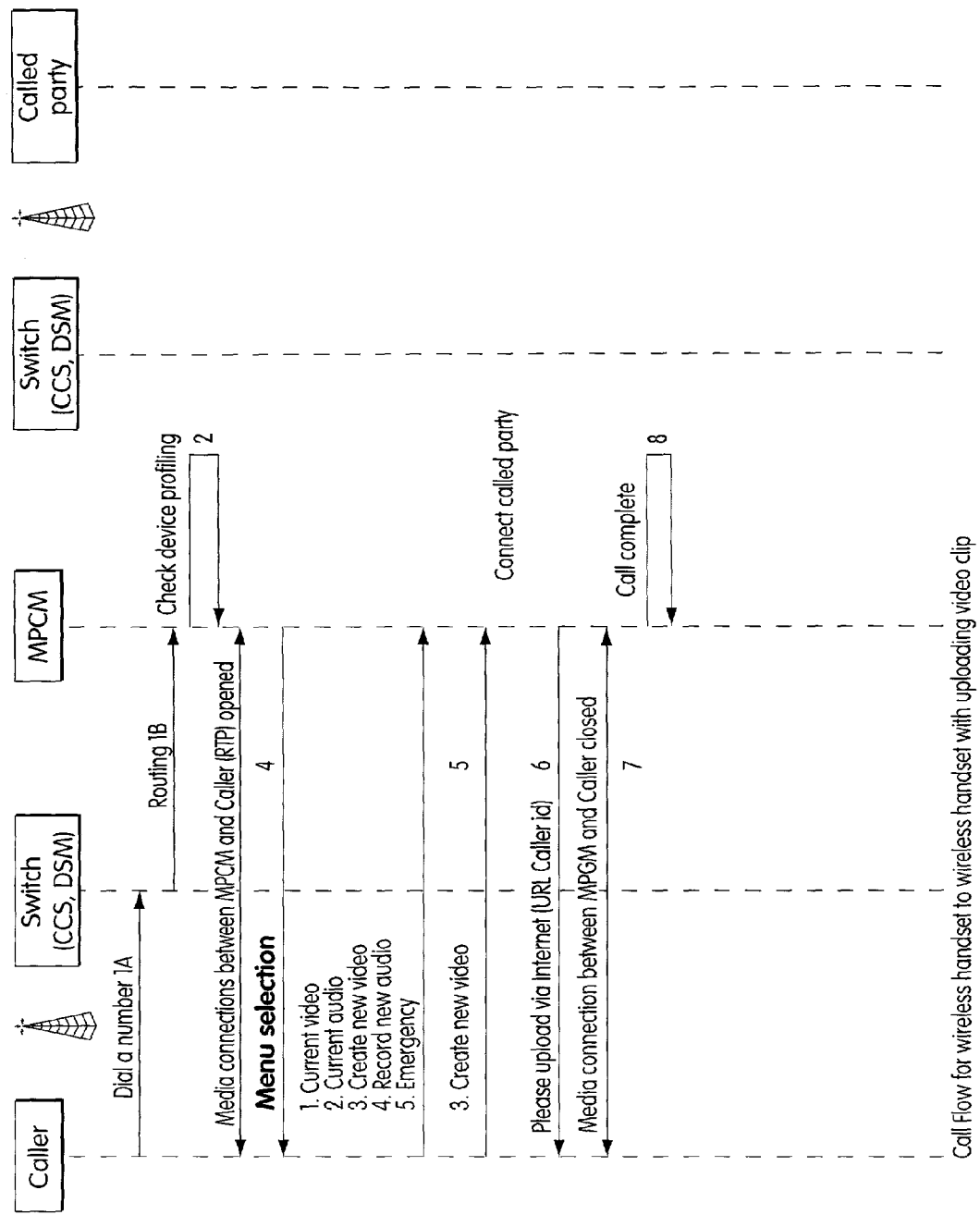

MULTIMEDIA PERSONALIZED CALL MANAGEMENT (MPCM)

FIELD OF THE INVENTION

The present invention relates generally to methods and systems for managing calls based on multimedia data, and more specifically to methods and systems that assist either a calling party or a called party or both in managing a call based on multimedia data.

BACKGROUND OF THE INVENTION

Multimedia communications will assume greater importance as broadband and next generation wireless services emerge. While there are currently systems that provide personal call management (PCM) for both wireline, and wireless transmission of audio signals, well-defined solutions do not exist for personal call management of calls based on multimedia data.

In the audio transmission context, the use of caller line identification (known as CLID, CLI or CID) systems in landline telephone systems as well as mobile telephone systems is well known. In a typical CID system, a display at the site of the called party provides the name and/or telephone number of a caller soon after the called party's telephone begins to ring. Thus, the called party can determine whether to take a call based on the name or telephone number of the calling party. The determination of whether to take a call based on such limited information can lead to rejection of important calls or reception of unwanted calls.

United States Statutory Invention Registration (SIR) No. H1714, published Mar. 3, 1998, and incorporated herein by reference in its entirety, describes a caller identification system that, in addition to sending the name and telephone number of a caller, also sends an image associated with the calling party.

However, the caller identification system disclosed in SIR H1714 is for use in a conventional (landline) telephone system. In conventional systems there is typically sufficient bandwidth available in the telephone system such that the additional bandwidth required to send an image with other caller identification information does not interfere with the signaling required to establish a call between the calling party and the called party. In typical mobile applications, the bandwidth available for caller identification in existing networks is limited and cannot typically support the sending of a caller's image along with other caller identification information. Future generation networks (including third generation networks) are being designed with additional bandwidth to support additional service features; however, these networks are not expected to be deployed on a wide scale until well into the future. Furthermore, even with a CID system that successfully sends an image associated with the calling party, the subject matter of the call may still remain unknown.

SUMMARY OF THE INVENTION

A need exists for methods and systems that allow either a calling party, a called party, or both to manage a call accurately and efficiently, regardless of whether the calling party or called party are using a wireless device. A need exists for systems that automatically and effectively manage calls based on multimedia data associated with call signaling sent prior to call establishment. Still another need exists for methods and systems that allow a calling party to clearly and unambiguously communicate the subject matter of the call and that allow the called party to manage the call based on the subject matter of the call.

The needs expressed above are met in embodiments of the present invention. In a first embodiment, the present invention provides a method for managing a call. The method includes receiving first data related to a call sent by a calling party to a called party. In response to the first data, the method obtains from a database second data related to the call. At least one of the first data, the second data, and a combination of the first and second data includes multimedia data. The method manages the call based at least in part on the multimedia data.

In another embodiment, the present invention provides a system for managing a call. The system includes a database operative to store data associated with subscribers and a multimedia personal call management (MPCM) server in communication with the database. The MPCM server has an interface for communicating over a network. The MPCM server receives over the network first data related to a call sent by a calling party to a called party. In response to the first data, the MPCM server obtains, from the database, second data related to the call. At least one of the first data, the second data, and a combination of the first and second data includes multimedia data. The MPCM server manages the call based at least in part on the multimedia data.

A MPCM system according to one embodiment of the invention exploits the fact that there are many different media types associated with a multimedia call. In contrast, typical CID systems operate only on one media, i.e., text data that provides the caller's phone number or name. In addition, an MPCM system according to one embodiment of the invention can subject each media type to different filtering rules and personalized call management actions. The use of additional media information associated with a multimedia call leads to more effective personal call management since the user or subscriber has additional filtering choices. A subscriber can use the MPCM service either to predefine the choices or rules for each media in a service profile associated with the subscriber or to construct the choices or rules dynamically.

A MPCM system can use multimedia subject based filtering. For present purposes, multimedia subject matter based filtering is filtering based on the subject matter of the call where the subject matter derives from multimedia data related to the call. For example, in one embodiment, as part of a call initiation process, a MPCM system presents a called party with a caller's name in text form and a video clip summarizing the purpose of the call. Using multimedia data to derive the subject matter of the call allows the called party to more accurately and effectively manage a call.

Multimedia communications technology provides opportunities for enhanced user experience via personalized multimedia call management. A MPCM system according to the present invention takes advantage of the multiple media types used in a multimedia call to influence call flow management. The MPCM system uses a predefined user profile, or rules that a user dynamically defines for each media type, to filter messages. Based on the filtering results, the MPCM system takes appropriate actions to control and direct the flow of the multimedia call. This system enables both a calling party and a called party to define individualized rules to specify or filter relevant information that can further influence the way a subscriber and/or the MPCM system handles a call. Mechanisms for efficient specification of information relevant to the call include, for example, video or audio clips supplied during a call establishment phase. The calling party can select a video or audio clip to send to the called party. Assuming the call passes through the MPCM service's initial automatic filters, the called party can view and/or listen to the clip when deciding on one of a set of possible responses to the call initiation request.

BRIEF DESCRIPTION OF THE DRAWINGS

For better understanding of the invention, reference is made to the drawings, which are incorporated herein by reference and in which:

FIG. 9 is a signaling flow diagram for a call from a wireless handset to the system of FIG. 1 where the calling party is uploading a video clip.

DETAILED DESCRIPTION

Embodiments of the present invention described herein manage calls based on multimedia data. As understood by those skilled in the art, particular embodiments of the present invention are not limited to calls placed over mobile telephone systems, but also may be used with landline systems or for calls between landline systems and mobile telephone systems.

Figure 1:
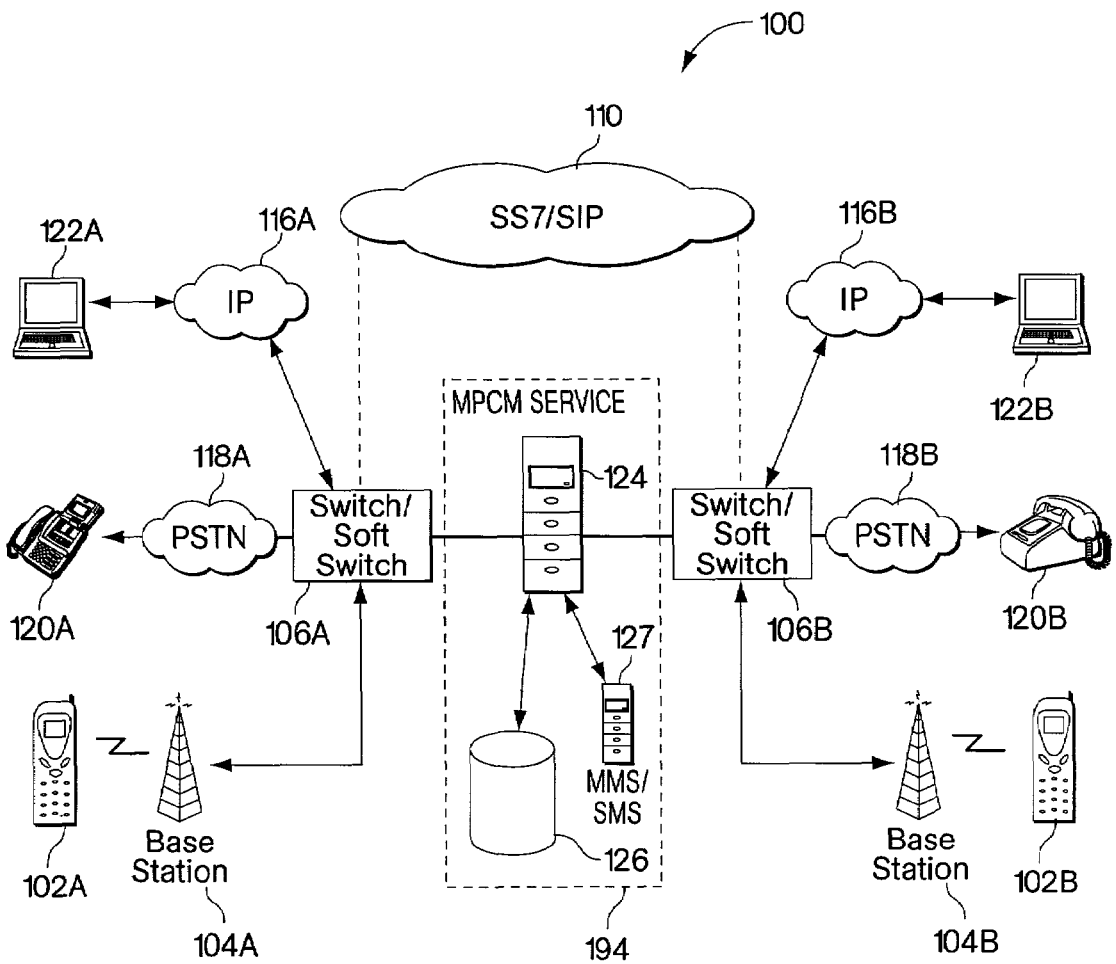
FIG. 1 is a functional block diagram illustrating a system according to one embodiment of the invention and the elements with which that system interacts.

FIG. 1 shows a functional block diagram of a portion of a communication system 100 including multimedia personal call management (MPCM) in accordance with a first embodiment of the present invention. The figure of the communication system 100 includes first and second handsets 102A and 102B in communication with first and second base stations 104A and 104B, which are, in turn, in communication with first and second gateways 106A and 106B. The gateways are in communication with a Signaling System 7 (SS7) network or an IP network using, for example, SIP (Session Initiation Protocol) for session control 110. The gateways can include at least one of a mobile switch, a digital switch, and a soft switch. As shown in FIG. 1, the gateways 106A and 106B are coupled to public switched telephone networks (PSTN) 118A and 118B, respectively. The PSTNs 118A and 118B are, in turn, coupled to landline handsets 120A and 120B. In addition, the system 100 includes a packet data switched network (PSDN) 116A (116B) coupled to gateway 106A (106B) and to a computing device 122A (122B).

The gateways are shown as coupled to an MPCM service 124. The MPCM service 124 can include a single server or multiple servers. In the multiple server embodiment, the system can have servers located in a single location or multiple locations. The MPCM service 124 couples to at least one database 126 and to at least one multimedia messaging service/short messaging service/WAP (Wireless Application Protocol) gateway 127.

With the exception of the MPCM subsystem 194 and, in certain embodiments, peripheral devices such as mobile handsets 102A and 102B, the components of the communication system 100 are well known to those of ordinary skill in the art. As described below, in some embodiments of the present invention, peripheral devices such as the mobile handsets 102A, 102B may include additional functionality to support MPCM service.

In one embodiment of the present invention, one implements the MPCM service 124 as a software module operating on one or more servers that are performing functions of a switching center 106A or 106B or on servers that communicate with the switching centers 106A and 106B. In other embodiments, one implements the MPCM service as software and/or hardware contained in one or more servers, coupled to the switching centers 106A and 106B, and having one or more processors. The MPCM service 124 manages calls placed over system 100. The MPCM service 124 manages calls based at least in part on multimedia data. The MPCM database 126 may be an independent database contained on a dedicated storage system, or may be part of another third-party database. The database 126 stores information including data for MPCM subscribers.

Figure 2:
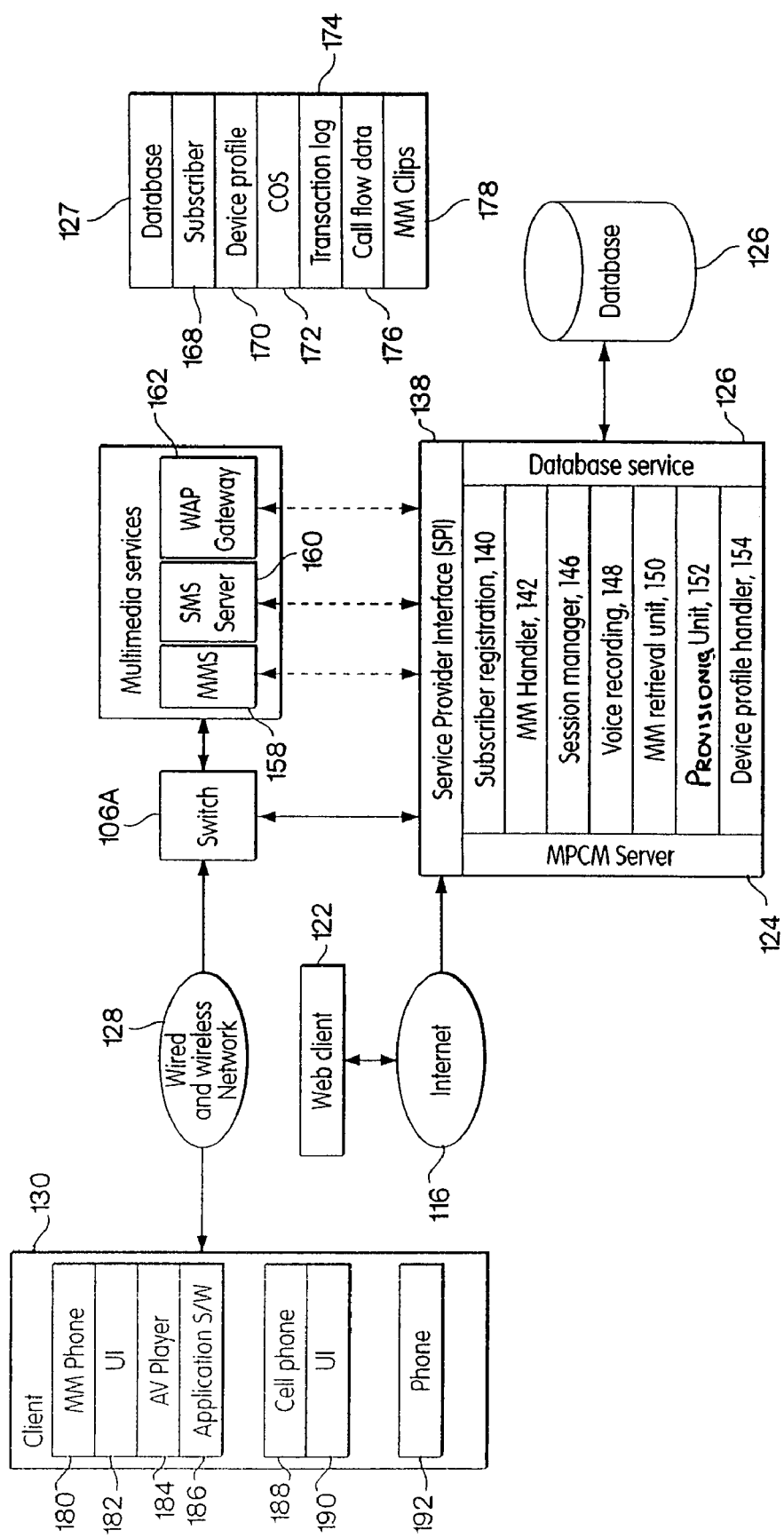
FIG. 2 shows components of the system of FIG. 1.
Figure 3:
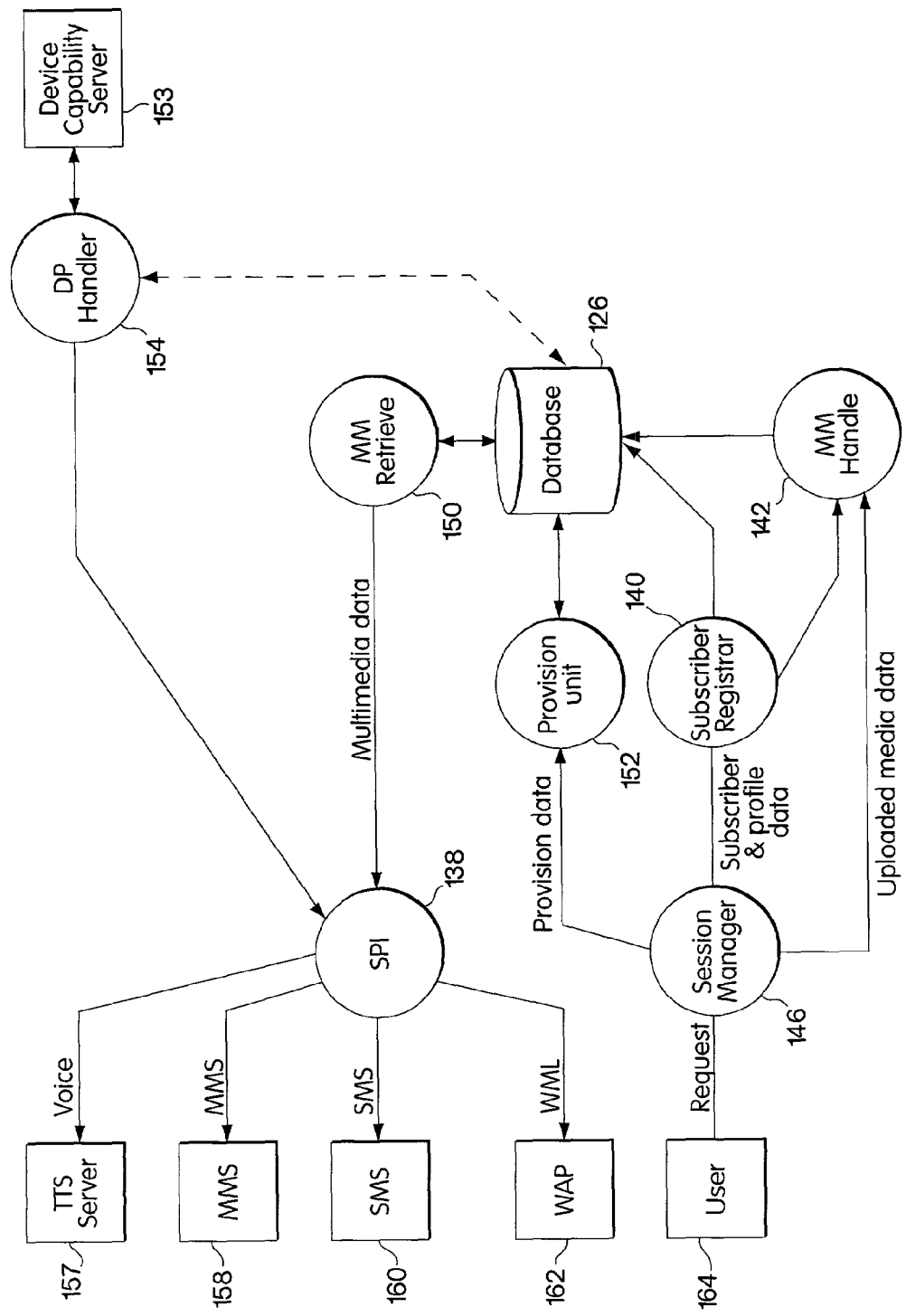
FIG. 3 shows the relationship of the components of the MPCM server of FIG. 1.

With reference to FIGS. 2 and 3, in one embodiment the MPCM service 124 resides on a server and includes a session manager 146 that receives a request from a user or client 130. The MPCM further includes a service provider interface 138 that communicates with switch 106A, wide area network, e.g., the Internet 116, and various multimedia services 158, 160, 162. In addition, the MPCM includes a subscriber registration module 140, a multimedia message (MM) handler 142, a voice-recording module 148, a MM retrieval unit 150, a provisioning unit 152, and a device profile handler 154.

The session manager 146 stores session states and controls the call/session flow. The session manager 146 provides provision data to the provisioning unit 152, subscriber and profile data to the subscriber registration module 140, and uploaded media data to the multimedia message (MM) handler 142.

The provisioning unit 152 communicates with the database 126 in addition to the session manager and provides facilities for personal configuration, customization, and call flow setup. Personal configuration allows the user to specify call control rules. Customization allows the user to select or deselect services. If a subscriber does not specify preferences or call control rules at the time of call setup, the provisioning unit uses the default preferences set up at the time of service subscription. In one embodiment, the default setup allows the call flow control to skip all the steps for a group of selected numbers such as calls from family, and close friends.

In the illustrated embodiment, the subscriber registration module 140 communicates with the database 126, the MM handler 142, and the session manager 146 and allows a user to subscribe to the system. At registration time, the database stores the class of service records, and subscriber and device profiles.

The MM handler 142 also communicates with the database 126 and the session manager 146 and uploads a multimedia message via a web browser or via the hypertext transfer protocol (HTTP). Similarly, the voice-recording module 148 (not shown in FIG. 3) communicates with the database 126 and the session manager 146 and uploads a voice recording.

The MPCM service 124 further includes a multimedia message (MM) retrieval unit 150 that communicates with the database 126. The MM retrieval unit 150 retrieves configured call control rules and multimedia data associated with a call from the database and filters the call by applying any applicable call control rules to the multimedia data. The MM retrieval unit 150 then passes multimedia data to a service provider interface (SPI) 138, an interface component for communication between the MPCM server and the TTS server 157, the multimedia messaging service (MMS) 158, the short message service (SMS) 160, or wireless application protocol (WAP) service 162. The MMS service, the SMS service, and the WAP service were shown as server 127 in FIG. 1.

The MPCM service 124 also includes a device profile handler 154 that communicates with the database 126 or the SPI 138 depending on whether the device profile is stored in MPCM database. The device profile handler 154 formats data appropriately depending on the capabilities of registered user devices. For example, depending on a called party device profile, the device profile handler 154 selects one of the TTS, MMS, SMS, or WAP services and may adapt the multimedia data to the called party's device capability. The DP handler 154 also communicates with device capability server 153.

The Multimedia Messaging Service (MMS) is an existing system such as Comverse MMS available from Comverse Network Systems, Inc. of Wakefield Mass. The MMS system has several components. An MMS relay component transfers messages between different messaging systems by suitably transcoding multimedia messages. An MMS server stores and handles incoming and outgoing messages. An MMS store component contains data including user profile data, subscription data, and user media clips. A location server or MMS user agent provides a user with the ability to view, compose, and handle multimedia messages (including sending, receiving, and deleting multimedia messages).

The MMS can be built based on current standardization efforts in the 3$^{rd}$ Generation Partnership Project (3GPP), a project directed to the standardization for global systems for mobile communication. These efforts, and MMS in general, are described in a publication entitled "3$^{rd}$ Generation Partnership Project: Technical Specification Group Terminals; Multimedia Messaging Service (MMS); Functional description; Stage 2 (Release 4)," which is incorporated herein by reference in its entirety, and which is available from the 3GPP Orginisational Partner's Publications Office of Valbonne France. The concept of MMS is rather different from SMS. SMS is focused on the use of signaling links that have limited spare bandwidth. MMS, on the other hand, delivers much larger messages in a reasonable time using data channels that have a relatively large amount of bandwidth.

The Short Message Service (SMS) is an existing system such as Comverse Smart SMS Center available from Comverse Network Systems, Inc of Wakefield, Mass. If a called party's device does not support SMS then the system according to one embodiment converts the short message to voice using a known text-to-speech conversion process. A publication entitled "Universal Mobile Telecommunications System (UMTS); Technical realization of the Short Message Service (SMS) (3G TS 23.040 version 3.3.0 Release 1999)" which is incorporated herein by reference in its entirety, and which is available from the European Telecommunications Standards Institute Office in Valbonne France, describes SMS in greater detail.

With reference to FIG. 2, the multimedia services, e.g., the multimedia message service (MMS), short message service (SMS), and wireless application protocol (WAP) service communicate with wired and/or wireless networks 128 through a gateway or switch 106A. Similarly, the MPCM service 124 can communicate with wired and/or wireless networks 128 through a gateway or switch 106A, or it can communicate with a wide-area network (WAN) 116, such as the Internet, directly.

A client 130 also communicates with the wired and/or wireless network 128. The client 130 can be a multimedia (MM) phone 180 having a user interface 182 that allows the user to describe, insert, update, and delete a multimedia clip. The MM phone can include a multimedia player such as an audiovisual (AV) player 184 that can play audio and/or video data clips. Examples of such devices include a NOKIA phone having an audiovisual player such as REALPLAYER, an ERICSSON phone having an audiovisual player such as MICROSOFT multimedia player also known as Windows Media Player, a multimedia PC or laptop, or other suitable devices. The MM phone 180 further includes application software 186 that receives and decodes multimedia messages sent by the Multimedia Messaging Service (MMS) 158. This software packages the multimedia message and then starts the AV player 184 so that the called party can view/listen to the message. Other clients 130 include a conventional phone 192 and a cell phone 188 having a user interface 190.

With continued reference to FIG. 2, one embodiment of the database 126 associated with the MPCM service 124 includes subscriber profile records 168, device profile records 170, class of service (COS) records 172, a transaction log 174, and call flow data 176. The subscriber profile records store subscriber profile data including Name, Address, Telephone number, and Names, and Phone numbers of friends or family members that need special handling by the MPCM service.

The device profile records stores information concerning personal devices of subscribers. Such information could include: Device id and Device type data. The device type data could include: AV player media type; Manufacturer; Standard, and Memory capacity.

The COS record specifies services enabled for a group of subscribers. The COS record contains the following information: COS ID; storage limitations for multimedia services; retention date of a multimedia clip; and whether the system should archive applicable clips.

An activity profile (not shown) accumulates statistics of subscribers' activity. The system uses a transaction log 174 for billing, statistics collection, and inquiry processing. The transaction log 174 contains information regarding date and time of call, calling and called party phone number, multimedia file transferred, size of the file, call duration, and call control path selected by the called party. The database 126 also includes MM clips 178. The MM clips include audio or video clips that a subscriber wishes to store.

Figure 4:
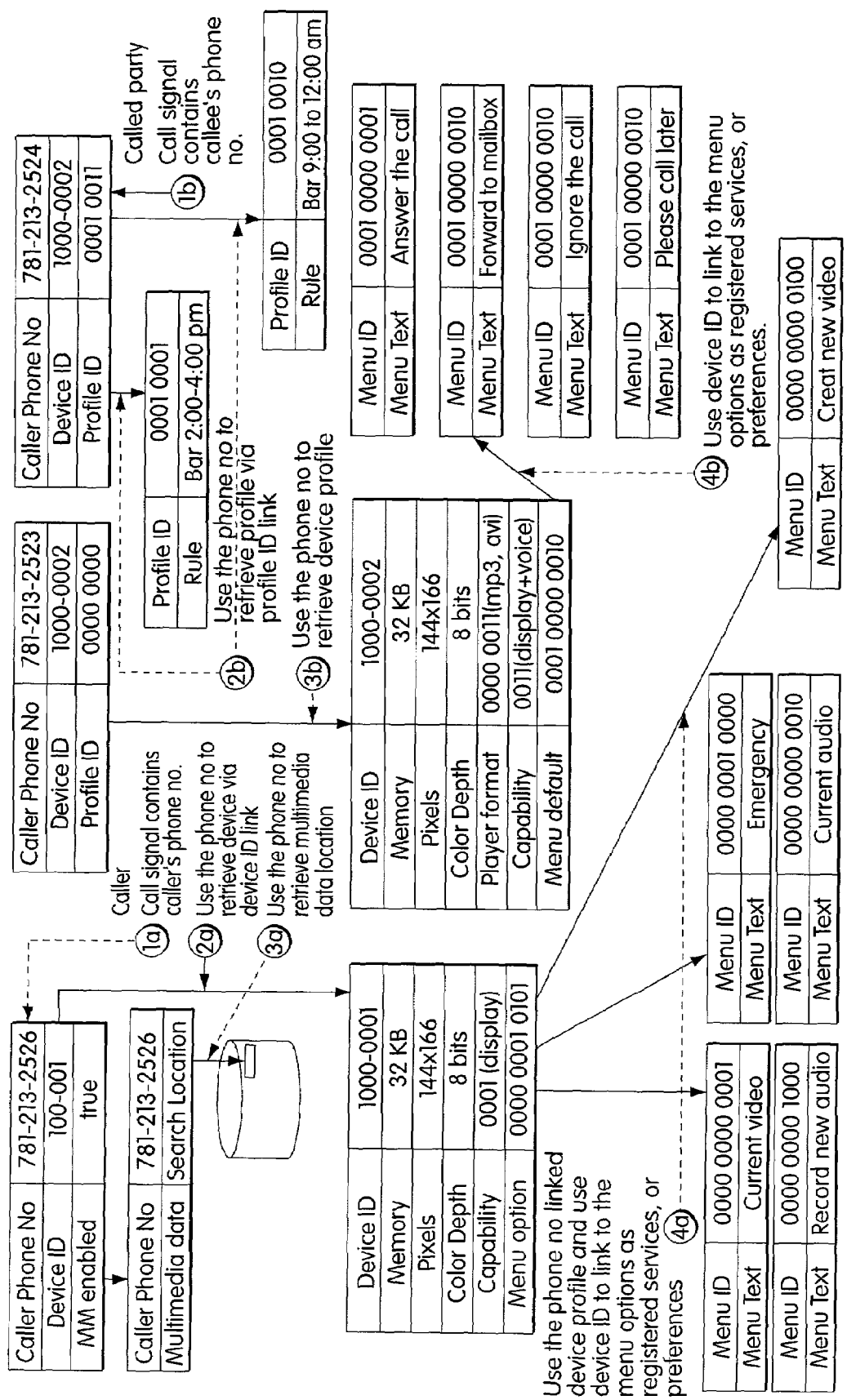
FIG. 4 shows one embodiment of data structures for use with the system of FIG. 1.

The system uses customized call flow data 176 to direct a call based on different scenarios. The MPCM service can store and use the call flow data. There are many ways to implement the call flow data. One example of call flow data structures and how to use the structures are shown in FIG. 4. This example of call flow data structures is for illustration purposes only and actual implementations can vary. For example, the filtering rules listed after step 2*b* in FIG. 4 can also include a subset of data structures as is known to those of ordinary skill in the art.

With reference to FIGS. 3 and 4, under the caller, i.e., the calling party category, at (1*a*), the session manager 146 receives a call signal that contains the calling party's phone number. At (2*a*), the device profile handler uses the calling party phone number to retrieve the calling party's device profile via the device ID link. At (3*a*), the MM retrieval unit uses the calling party phone number to retrieve a multimedia data location. Finally, at (4*a*), the device profile handler uses the phone number linked device profile to link to the menu options as registered services or preferences.

Similarly for the called party data, at (1*b*), the session manager 146 receives a call signal that contains the callee's, or called party's, phone number. At (2*b*), the MM retrieval unit uses the called party phone number to retrieve the called party's personal profile via the profile ID link. At (3*b*), the device profile handler uses the called party phone number to retrieve the called party's device profile. Finally, at (4*b*), the MM retrieval unit uses the phone number linked device profile ID to link to the menu options as registered services or preferences.

Figure 5:
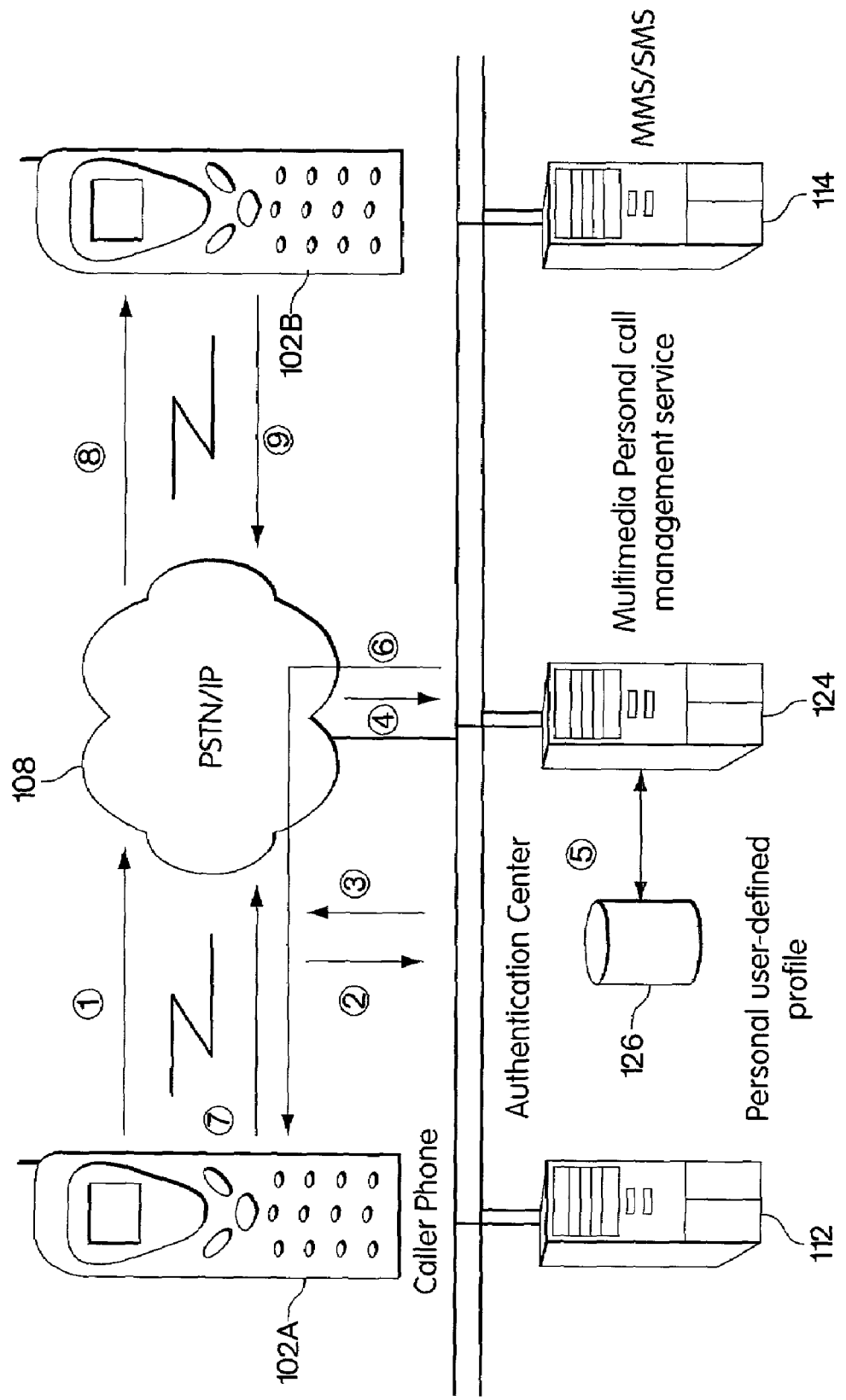
FIG. 5 illustrates signal flow associated with the system of FIG. 1 according to one embodiment of the present invention.

With reference to a simplified call flow example provided in FIG. 5, in operation, one embodiment of the system of FIG. 1 requires that both the calling party and the called party register as subscribers. FIG. 5 illustrates the following call flow:

(1) A caller calls a number using a device, e.g., 102A.
(2) The authentication center authenticates the calling party and, if the calling party is not a registered subscriber, it routes the call to a switch, e.g., 106A.
(3) The authentication center authenticates the called party and, if the called party is not a registered subscriber, it routes the call to the switch. e.g., 106B.
(4) If the authentication center authenticates both parties then the switch/soft switch 106A connects the calling party to the MPCM server.
(5) The MPCM service 124 checks the personal user-defined profiles for both the calling party and the called party.
(6) The MPCM service sends a menu of choices to the calling party based on a subscribed service profile for the calling party and based on the profile of the called party.
(7) The caller selects a media clip (e.g., including audio data and/or video data and/or non-medium specific data) for transmission to the called party.
(8) The MPCM service provides the called party with a menu of choices from which to select. The called party selects one of the choices. Depending on the selection, the MPCM service initiates subsequent actions, such as transferring the calling party to the called party's voice mail.

In an alternative embodiment, the MPCM service requires only the caller to subscribe to the service. In this embodiment, the call flow proceeds as follows:

(i) A caller calls a number using a device, e.g., a mobile handset 102A.
(ii) The authentication center authenticates the caller and if the caller is not a registered subscriber it routes the call to a switch, e.g., 106A.
(iii) If the authentication center authenticates the caller then a connection is established between the caller and the MPCM server.
(iv) The MPCM service checks the caller's profile.

(v) The MPCM service sends a menu of choices to the caller based on the subscribed service profile.
(vi) The caller selects a media clip (e.g., including audio data and/or video data and/or non-medium specific data) for transmission to the called party.
(vii) The MPCM server checks the device capability of the called party. If the required capability cannot be found then it defaults to the voice channel.
(viii) The MPCM server converts the contents to the necessary format based on the device capability.
(ix) The called party is provided with a menu of choices to select from. The called party selects an action. Depending on the selection, the MPCM initiates subsequent actions.

In yet another embodiment, the MPCM service requires only the called party to subscribe to the service. In this embodiment, the call flow proceeds as follows:

(i) A caller calls a number using a device, e.g., a mobile handset 102A.
(ii) The call is routed to the called party switch.
(iii) The called party switch routes the call to the authentication center. The called party is authenticated. If the called party is a registered subscriber the switch routes the call to the MPCM server.
(iv) The MPCM service checks the called party's profile.
(v) The MPCM service sends a menu of choices to the caller based on a subscribed service profile, the profile of the called party and/or the content stored on the server. The content stored on the server includes the calling parties' uploaded multimedia clips. The calling parties' receive an access number after the multimedia has been uploaded for later use.
(vi) The caller selects a media clip (e.g., including audio data and/or video data and/or non-medium specific data) for transmission to the called party according to calling party phone number or access number.
(vii) The called party is provided with a menu of choices to select from. The called party selects an action. Depending on the selection, the MPCM service initiates subsequent actions.

Figure 6:
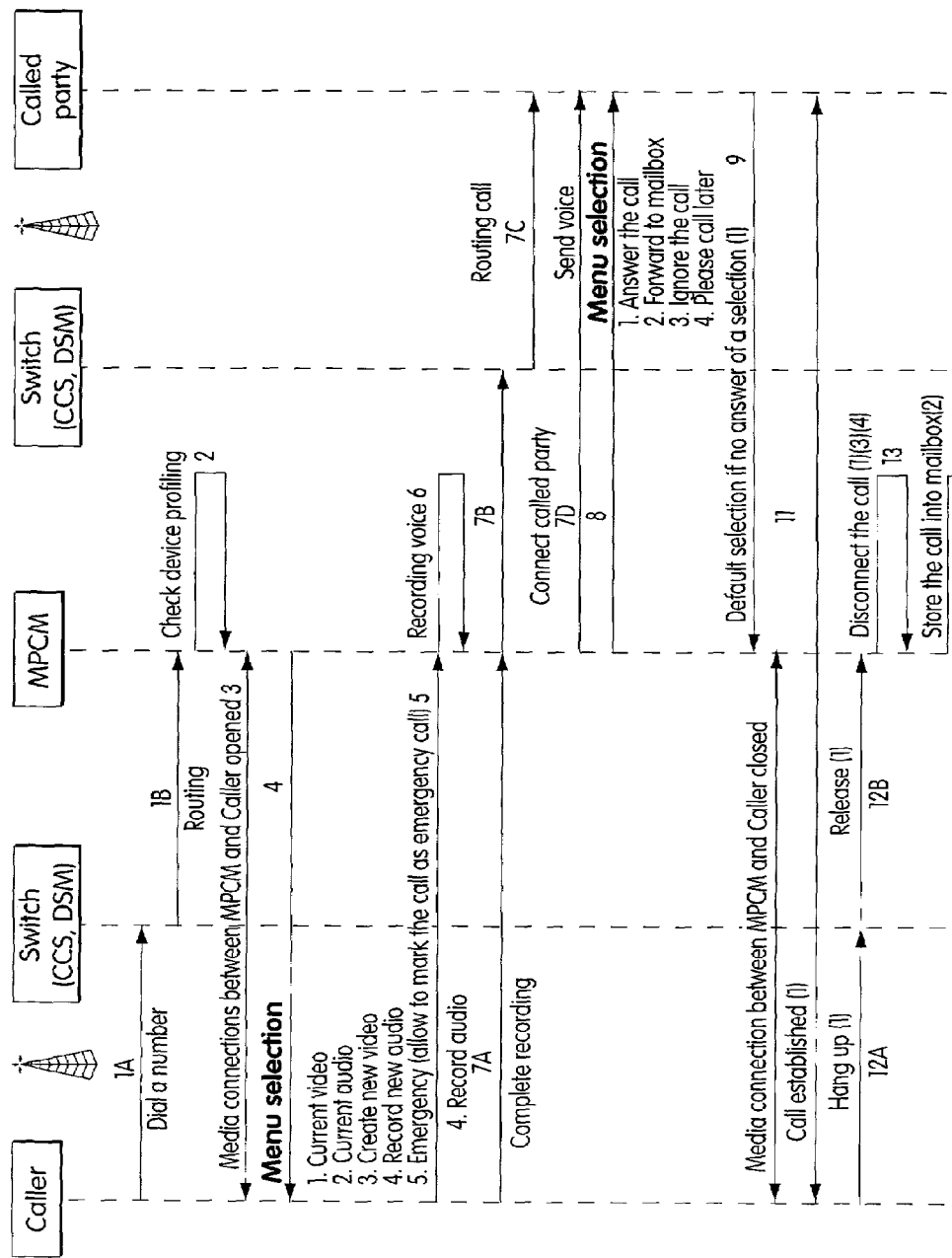
FIG. 6 is a signaling flow diagram for a call from a wireless handset through the system of FIG. 1 to another wireless handset where the call is initiated with an audio clip.

Having described three generalized cases directly above, FIGS. 6-9 illustrate signaling flows for several specific applications of embodiments of the present invention. FIG. 6 depicts the call flow from a first wireless handset to a second wireless handset with the transmission of audio data. In this call flow, the caller initiates (1A) a call, e.g., with an Initial Address Message (IAM), Session Initiation Protocol (SIP) Invite. SIP, the Session Initiation Protocol, is a signaling protocol for Internet conferencing, telephony, presence, events notification and instant messaging. SIP was developed within the IETF MMUSIC (Multiparty Multimedia Session Control) working group, with work proceeding since September 1999 in the IETF SIP working group.

The Switch then routes (1B) the call to an MPCM server. The MPCM server obtains (2) the device profile associated with the called number via Device ID. If the calling party has predefined rules based on, for example, time of day, place, or other options such as specific called numbers, the MPCM acts based on these rules. Note that the rules can be specified at registration time or using suitable means these rules can be specified at a later time. If the rules preclude the need for further input from the calling party, control then transitions to 7B. Otherwise, the MPCM service opens (3) the media channel connection to the calling party's device (possibly sending media streams using the Real-time Transport Protocol (RTP)).

The MPCM service sends (4) a menu of options to the calling party. The caller selects (5) from the menu of options. In the sequence illustrated in FIG. 6, the user chooses to record a voice clip. Accordingly, the MPCM service obtains (6) a voice clip from the calling party. The caller indicates (7A) to the MPCM service that the recording is complete. The MPCM service connects (7B, 7C) the called party via a switch. If a soft switch is employed, suitable bindings for a media channel are established for sending a multimedia message (in this example a voice clip) to the called party.

The MPCM service sends (7D) the recorded voice clip to the called party. The MPCM service sends (8) a menu of options to the called party based on the called party's profile. If the called party is not available, as illustrated, then the MPCM service applies (9) the default selection (for example, the MPCM service forwards the call to a mail box).

The MPCM service then closes (10) the media connection. The MPCM service establishes (11) a connection between the caller and the called party's mailbox. The MPCM service releases (12A and 12B) the call once the caller hangs up. The MPCM service disconnects (13) the call. The MPCM service stores (14) the caller's message in the mailbox.

If the called party is available, the party then chooses from the menu of options and the MPCM service acts on the called party's selection. Assuming the called party chooses to answer the call, the MPCM service closes the media connection for the voice clip. The MPCM service establishes the call between the caller and the called party. The MPCM service releases the call once the caller hangs up and the MPCM service disconnects the call.

FIG. 6 illustrates call flow for one of many possible combinations of choices. In general, if the calling party has M options and the called party has N options, a total of MN combinations exists. FIGS. 6-9 do not illustrate each case in detail but rather show the richness of the present invention with a variety of examples.

Figure 7:
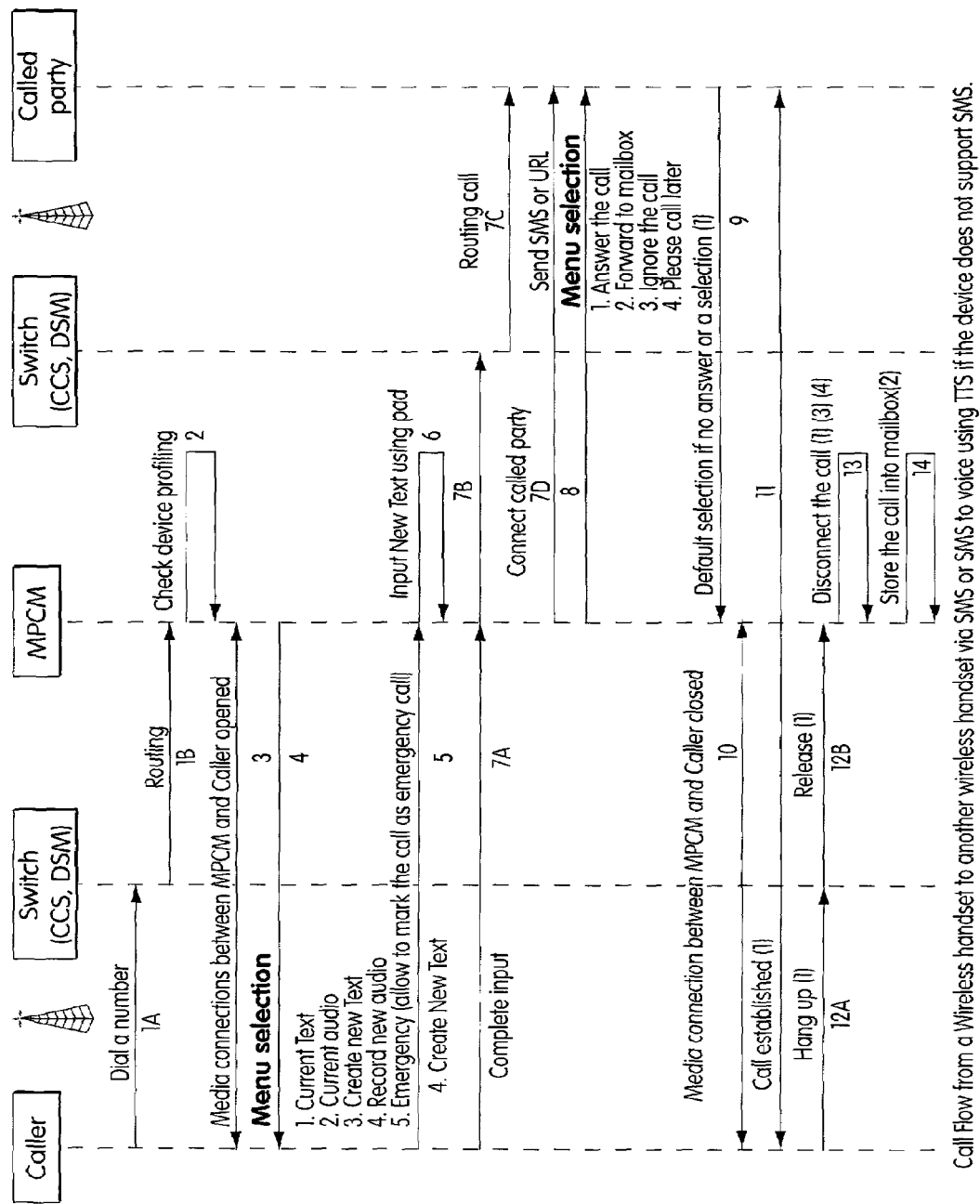
FIG. 7 is a signaling flow diagram for a call from a wireless handset through the system of FIG. 1 to another wireless handset where the call is initiated using short message service (SMS)

FIG. 7 is similar to FIG. 6 and illustrates the call flow from one wireless handset to another wireless handset using SMS, or using, text to speech (TTS) or WAP push gateway, if the called party's device does not support SMS. More specifically, the calling party selects (5) to create new text. The MPCM service receives (6) the new text and then the MPCM sends (7D) SMS. If the text exceeds the SMS limit then SMS will send a uniform resource locator (URL), or use WAP push gateway to push the URL contents.

Figure 8:
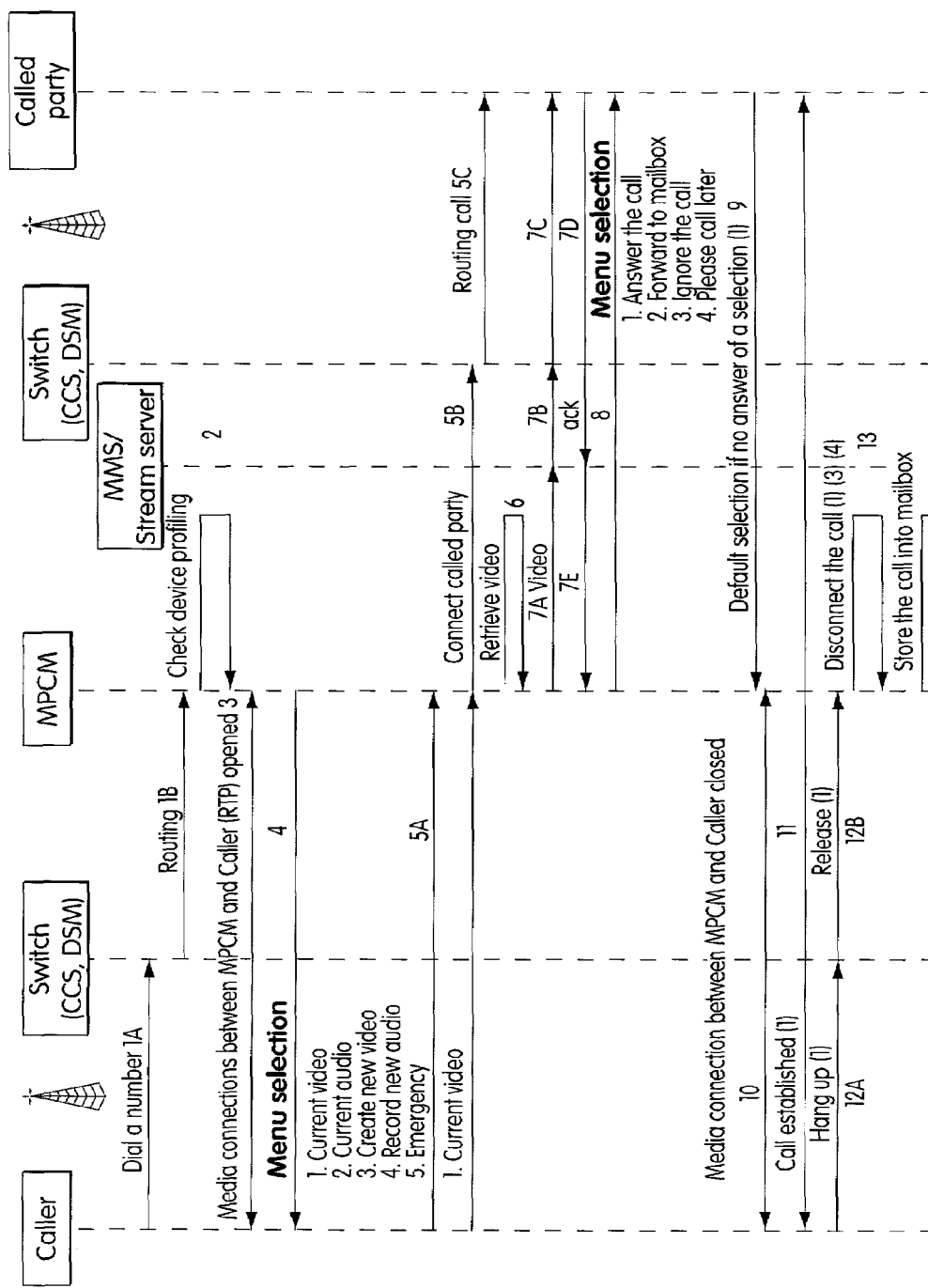
FIG. 8 is a signaling flow diagram for a call from a wireless handset through the system of FIG. 1 to another wireless handset where the call is initiated with a video clip.

FIG. 8 is similar to FIGS. 6 and 7 and illustrates a call flow from one wireless handset to another wireless handset using a video clip. More specifically, the calling party selects (5) to use a current video clip. The MPCM service retrieves (6) a video clip, e.g., a previously stored video clip, and the MPCM service sends (7A) the video clip, via the MMS server and the switch, to the called party.

FIG. 9 is similar to FIG. 8 and illustrates a call flow for uploading a video clip to an MPCM service database. More specifically, the calling party calls (1A) into the MPCM service and selects (5) "create new video." The MPCM service uploads (6) the video clip, e.g., via a uniform resource locator (URL). In other words, the calling party provides to the MPCM service a URL for the location of the video clip.

In the event that the MPCM service uses MMS for video messaging, the handset contains software that allows the handset to: View, and/or listen to, the multimedia message from MMS; Retrieve a suitable multimedia message from MPCM service; Decode the multimedia message to decide if the message transmission is complete; Receive the multimedia message until the message is complete; Package the multimedia message; and Start a multimedia player.

If the MPCM service does not use MMS for sending a multimedia message, the MPCM service can use the streaming server to stream out multimedia content and remotely start the multimedia player at the called party's site by issuing a suitable command based on the device profile.

Figure 10A:
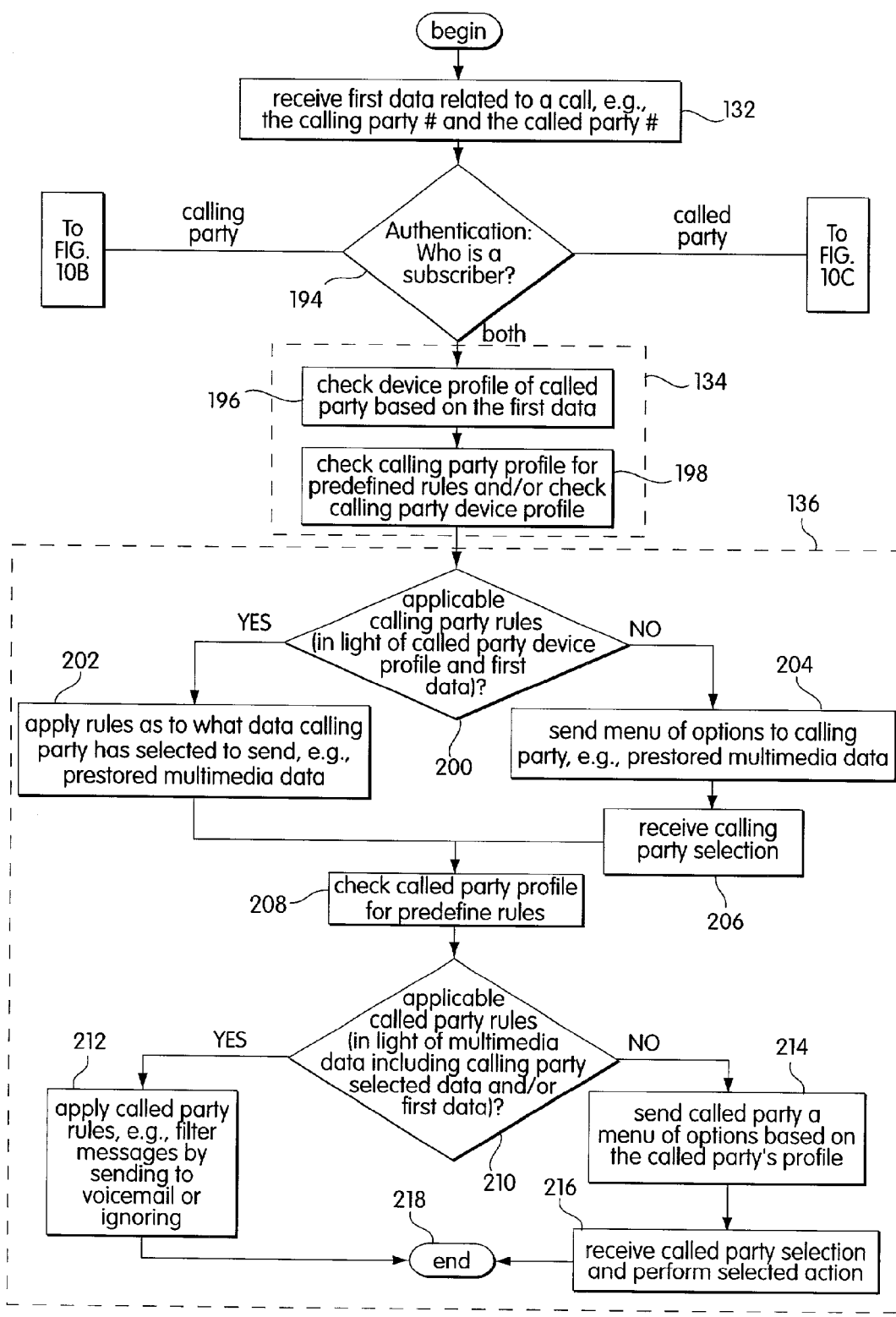
FIGS. 10A-10C are flow charts showing the operation of one embodiment of the system of FIG. 1.
Figure 10B:
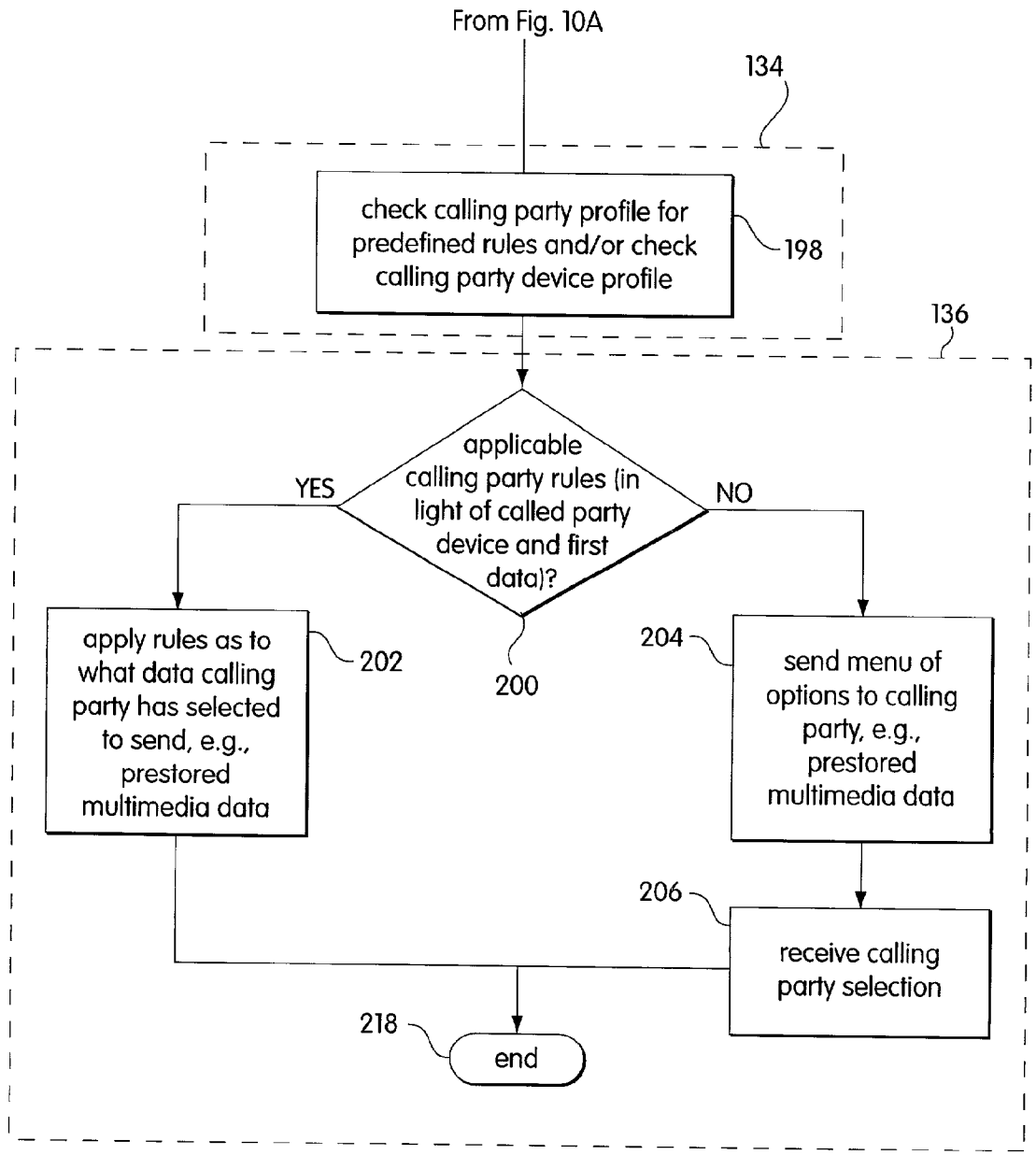
Figure 10C:
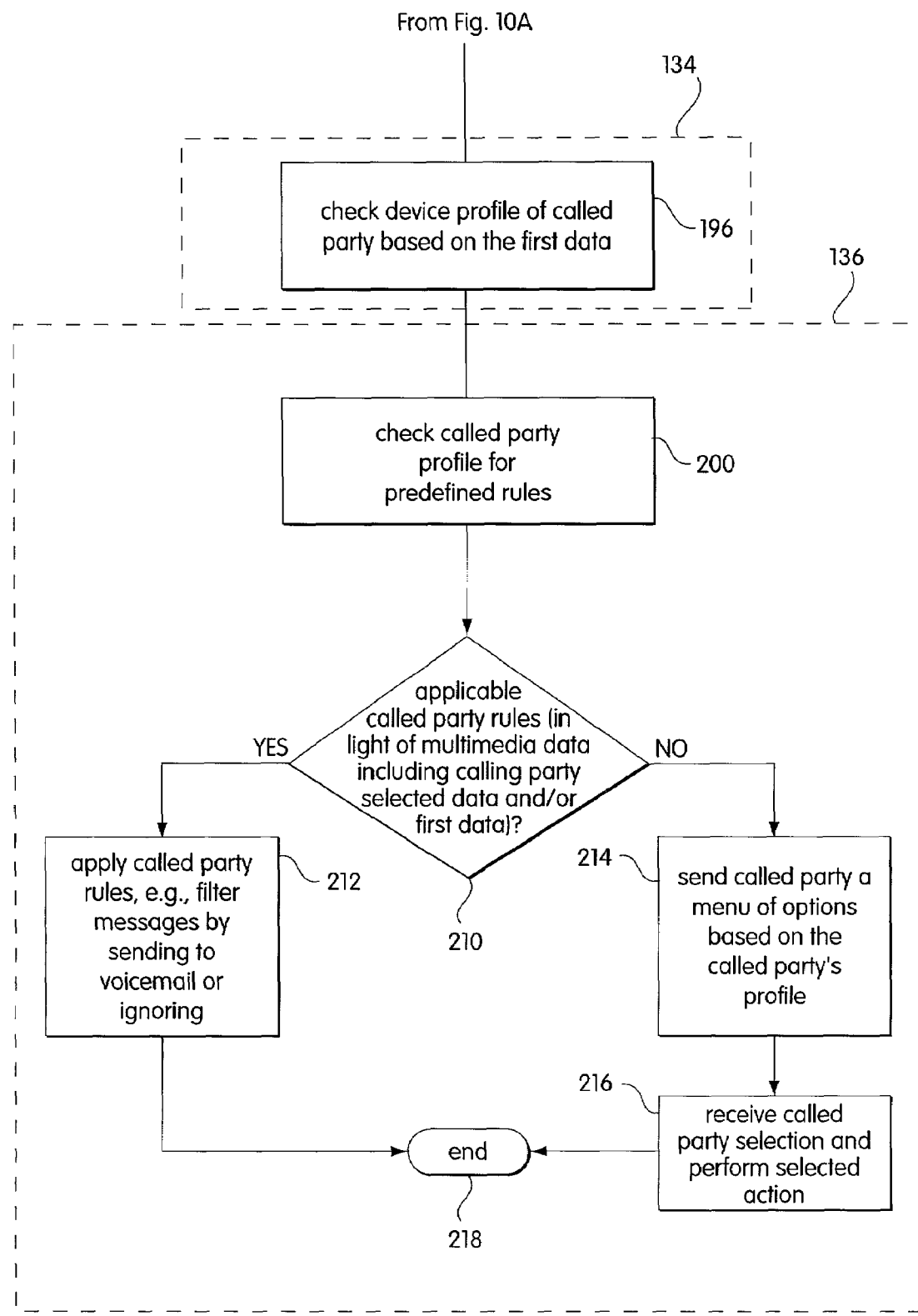

Having described the operation of certain embodiments using signaling flow sequences, FIGS. 10A-10C illustrate the operation of certain embodiments using flow charts. With reference to FIG. 10A, a system according to one embodiment of the present invention initially receives 132 first data, e.g., the calling party number and the called party number, related to a call. An authentication center authenticates 194 the calling party and the called party. If the authentication center authenticates both parties as subscribers, the system then checks 196 the device profile of the called party. The system also checks 198 the calling party profile for predefined rules and/or checks 198 the calling party's device profile to determine the capabilities of the calling party's device. The system subsequently determines 200 if there are any applicable calling party rules or call controls. If there are applicable rules, the system applies 202 the rules. If not, the system provides 204 a menu of choices to the calling party.

Upon receipt 206 of the calling party's selection or upon execution of the applicable rules, the system checks 208 the called party profile for applicable rules. Similarly if there are applicable rules 210, the system applies 212 the rules. If not, the system provides 214 a menu of choices to the called party. Upon receipt 216 of the called party's selection or upon execution of the applicable rules, the system terminates 218 the process. In sum, the system receives 132 first data. In response to the first data related to the call, the system obtains 134 second data related to the call. At least one of the first data, the second data, and the combination of the first and second data forming multimedia data. The system then manages 136 a call based on the multimedia data.

If only the calling party is a subscriber, then the system proceeds down a subset of the steps outlined in FIG. 10A as illustrated in FIG. 10B. More specifically, the system checks 198 the calling party profile for predefined rules and/or checks the calling party's device profile. The system then determines 200 whether there are any applicable calling party rules. If these are applicable rules, the system applies 202 the rules. If not, the system provides 204 a menu of choices to the calling party and receives 206 the calling party selection. Similarly, if only the called party is a subscriber, then the system proceeds down a subset of the steps outlined in FIG. 10C. More specifically, the system checks 196 the device profile of the called party. Then the system checks 208 the called party profile for applicable rules. Similarly if there are applicable rules 210 the system applies 212 the rules. If not, the system provides 214 a menu of choices to the called party. Upon receipt 216 of the called party's selection or upon execution of the applicable rules, the system terminates 218 the process.

There are a variety of situations in which the present invention is useful. Using the present invention, a salesman can initiate a call by supplying a product video clip to the called party. The called party can view the clip to determine whether, for example, to answer the phone, to direct the call to a different phone, to direct the call to a message box, or to send a message to the caller requesting the caller to call later at a more convenient time.

Alternatively, two sales persons from different organizations can vie for the attention of a business development manager at a customer's site. Based on the subject matter available via video, audio, or other data clips, the business development manager can prioritize the calls and direct the calls appropriately to her/his management team.

Embodiments of the present invention are also useful because the importance of a call can be time-dependent. For example, a purchaser may request information about a laptop computer from various vendors. The purchaser may then purchase a laptop that same day. One of the vendors contacted by the purchaser may call a week later by which time the purchaser has already purchased the product. With the present invention, when the sales person calls, based on the subject specified (in this example, information concerning a laptop), the purchaser can reject the call as being no longer relevant, saving time and effort for both the calling party and the called party.

Embodiments of a personal call management (PCM) system based on the methods and systems of the present invention lead to a feature-rich experience for users and to revenue generating opportunities for service providers. A PCM system can use multimedia subject based filtering. For present purposes, multimedia subject matter based filtering is filtering based on a the subject matter of the content or purpose of a call, where the system derives the subject matter from multimedia data. For example, as part of a call initiation process, a PCM system presents a called party with a caller's name in text form and a video clip summarizing the purpose of the call. If the video clip is in MPEG-4 format, one embodiment of the present invention could use the meta data associated with the MPEG-4 clip to derive the subject matter of the call. The system could then apply automatic filtering to the subject matter and/or present the subject matter to the called party. The use of multimedia subject matter based filtering allows the called party to accurately and effectively manage a call.

Multimedia communications technology provides opportunities for enhanced user experience via personalized multimedia call management. A Multimedia Personal Call Management (MPCM) system according to the present invention takes advantage of the multiple media used in a multimedia call to influence call flow management. The MPCM system uses a predefined user profile, or rules that are dynamically defined for each media, to filter messages. Based on the filtering results, appropriate actions are taken to control and direct the flow of the multimedia call. This system enables both calling and called parties to specify or filter relevant information that can further influence the way a call is handled. Mechanisms for efficient specification of information relevant to the call include, for example, video or audio clips supplied during call establishment phase. The calling party can select a video clip to send, which the called party can view and decide on one of a set of possible actions to take such as "Divert the Multimedia Call to a Message Store," "Set Call Waiting Indication," "I will call you later," "Please call me in 5 minutes," "Not interested," "Send me additional video clips regarding the house on the video clip," "Need a similar video camera but a different brand," and so on. The message can be sent in multimedia format.

Having thus described embodiments of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method for managing a call, the method comprising:
receiving first data related to a call sent by a calling party to a called party; in response to the first data related to the call, obtaining from a database second data related to the call, wherein at least one of the first data related to the call, the second data related to the call, and a combination of the first and second data related to the call comprising multimedia data; and managing the call based at least in part on the multimedia data, wherein the managing includes deriving a subject matter of a content or purpose of the call from multimedia data; and filtering the call by applying call control rules to the subject matter of the call, wherein the subject matter of the call is based on the content or purpose of the call derived from the multimedia data.

2. The method of claim 1, wherein managing the call comprises filtering the call based on a predefined user profile.

3. The method of claim 1, wherein managing the call comprises filtering the call using rules that are dynamically defined.

4. The method of claim 1, wherein the method further comprises providing at least one multimedia personal call management (MPCM) server computer for communicating through a gateway with at least one of a public switched telephone network (PSTN), a packet switched data network (PSDN), and a wireless network.

5. The method of claim 4, wherein the gateway includes at least one of a mobile switch, a digital switch, and a soft switch.

6. The method of claim 1, wherein the method further comprises prior to receiving the first data:
receiving authentication data related to a call sent by a calling party to a called party;
determining if at least one of the calling party and the called party is a subscriber based on the authentication data; and
in the event that at least one of the calling party and the called party is a subscriber, proceeding to receive the first data related to the call.

7. The method of claim 1, wherein the method further comprises prior to receiving the first data:
receiving authentication data related to a call sent by a calling party to a called party;
determining if both the called party and the calling party are subscribers based on the authentication data; and
in the event that both the calling party and the called party are subscribers, proceeding to receive the first data related to the call.

8. The method of claim 7, wherein the first data comprises called party number data.

9. The method of claim 8, wherein obtaining from a database second data related to the call comprises:
obtaining called party device profile data from at least one of a Home Location Register and a MPCM server.

10. The method of claim 9, wherein the first data further comprises calling party number data.

11. The method of claim 10, wherein obtaining from a database second data related to the call further comprises:
obtaining calling party profile data including any applicable calling party call control rule data.

12. The method of claim 11, wherein managing the call comprises determining from the calling party profile data whether there are any applicable call control rules.

13. The method of claim 12, wherein obtaining from a database second data related to the call further comprises: obtaining calling party device profile data.

14. The method of claim 13, wherein managing the call further comprises:
providing a menu of choices to the calling party based at least in part on the calling party device profile data; and
receiving calling party selection data.

15. The method of claim 14, wherein the choices provided to the calling party are selected from the group of choices consisting of use current video, use current audio, create new video, create new audio, and mark call as emergency.

16. The method of claim 14, wherein obtaining from a database second data related to the call further comprises:
obtaining called party profile data including any applicable called party call control rule data.

17. The method of claim 16, wherein managing the call comprises
determining from the called party profile data whether there are any applicable call control rules.

18. The method of claim 17, wherein managing the call further comprises:
responsive to at least one of applicable call control rule data or calling party selection data, forwarding call initiation data to the called party; and
forwarding a menu of response choices to the called party.

19. The method of claim 18, wherein the response choices forwarded to the called party are selected from the group of response choices consisting of answer call, forward call to mailbox, ignore call, and send "call later" signal to calling party.

20. A system for managing a call, the system comprising:
a database operative to store data associated with subscribers; and
a MPCM server in communication with the database, having an interface for communicating over a network, and operative to:
receive over the network first data related to a call sent by a calling party to a called party,
in response to the first data related to the call, obtain, from the database, second data related to the call, wherein at least one of the first data related to the call, the second data related to the call, and a combination of the first and second data related to the call comprising multimedia data, and
manage the call based at least in part on the multimedia data;
wherein the MPCM server includes
a session management module adapted to receive data related to the call from a user and operative to store session states and control call/session flow; and
a provisioning unit adapted to receive provisioning data from the session management module and to communicate with the database, the provisioning unit operative to provide facilities for personal configuration, customization, and call flow setup.

21. The system of claim 20, wherein the system further comprises an authentication center having an interface for communicating over a network and operative to confirm whether a party is a subscriber.

22. The system of claim 20, wherein the database stores multimedia data.

23. The system of claim 20, wherein the first data comprises a calling party number and a called party number.

24. The system of claim 20, wherein the system further comprises:
a messaging service server having an interface for communicating over a network and operative to provide at least one of multimedia messaging service and short messaging service.

25. The system of claim 20, wherein the network includes at least one of a PSTN, a packet switched data network and a wireless network and wherein the MPCM server communicates through a gateway with the network.

26. The system of claim 25, wherein the gateway includes at least one of a mobile switch, a digital switch, and a soft switch.

27. The system of claim 20, wherein the MPCM server comprises:
a multimedia message handler adapted to communicate with the session management module and the database, the multimedia message handler operative to upload a multimedia message.

28. The system of claim 20, wherein the MPCM server comprises:
a multimedia message (MM) retrieval unit adapted to communicate with the database and with the service provider interface, the MM retrieval unit operative to retrieve from the database configured call control rules and multimedia data including at least part of the first data and the second data,
filter a call by applying the call control rules to the multimedia data.

29. The system of claim 28, wherein the control rules are predefined.

30. The system of claim 28, wherein the MM retrieval unit is operative to receive and process dynamically defined filtering rules.

31. The system of claim 28, wherein the MM retrieval unit transmits subject matter data to the called party using multimedia data.

32. The system of claim 20, wherein the interface comprises:
a service provider interface for communicating with at least one of a MMS server, a WAP server, and a SMS server.

33. The system of claim 32, wherein the database comprises:
subscriber profile records for storing subscriber profile data including data for use in managing a call based at least in part on multimedia data; and
device profile records for storing information concerning personal devices of subscribers.

34. The system of claim 33, wherein the database further comprises:
class of service records for storing services enabled for a group of subscribers; and
call flow data used by the system to direct a call.

35. The system of claim 33 wherein the MPCM server comprises:
a subscriber registration module adapted to communicate with the session management module and the database, the subscriber registration module operative to allow a user to subscribe to the system.

36. The system of claim 33, wherein the MPCM server further comprises:
a device profile handler in communication with the database and with service provider interface, the device profile handler operative to format data appropriately depending on the capabilities of registered user devices.

37. A method for managing a call, the method comprising:
receiving authentication data related to a call sent by a calling party to a called party;
determining if both the calling party and the called party are subscribers based on the authentication data;
in the event that both the calling party and the called party are subscribers, receiving calling party and called party number data;
using the called party number data, obtaining called party device profile data from a database;
using the calling party number data, obtaining calling party profile data; managing the call based at least in part on the called party device profile and the calling party profile data, managing the call comprising:
sending a menu of choices to the calling party based at least in part on the calling party profile data;
receiving calling party selection data;
forwarding call initiation data to the called party based at least in part on the calling party selection data and on the called party device profile data; and
forwarding a menu of response choices to the called party.

38. A system for managing a call, the system comprising:
(a) an authentication center having an interface for communicating over a network and operative to:
receive authentication data related to a call sent by a calling party to a called party; and
verify that both the calling party and the called party are subscribers based on the authentication data;
(b) a database operative to store data associated with subscribers, the database comprising:
subscriber profile records for storing subscriber profile data including data for use in managing a call based at least in part on multimedia data; and
device profile records for storing information concerning personal devices of subscribers;
(c) at least one MPCM server computer having an interface for communicating over a network, the MPCM server operative to:
receive first data related to a call sent by a calling party to a called party, in response to the first data related to the call, obtain from the database second data related to the call, wherein at least one of the first data related to the call, the second data related to the call, and a combination of the first and second data related to the call comprising multimedia data, and
manage the call based at least in part on the multimedia data, the MPCM server comprising:
a session management module adapted to receive data related to the call from a user and operative to store session states and control call/session flow;
a provisioning unit adapted to receive provisioning data from the session management module and to communicate with the database, the provisioning unit operative to provide facilities for personal configuration, customization, and call flow setup; and
a multimedia message (MM) retrieval unit adapted to communicate with the database and with the interface, the MM retrieval unit operative to retrieve from the database configured call control rules and multimedia data including at least part of the first data and the second data related to the call, and
filter the call by applying the call control rules to the multimedia data.

39. A computer readable medium storing a computer program executable on a server for controlling the server to:
receive first data related to a call sent by a calling party to a called party;
in response to the first data related to the call, obtain from a database second data related to the call, wherein at least one of the first data related to the call, the second data related to the call, and a combination of the first and second data related to the call comprising multimedia data; and
manage the call based at least in part on the multimedia data;
wherein the server includes
a session management module adapted to receive data related to the call from a user and operative to store session states and control call/session flow;
a provisioning unit adapted to receive provisioning data from the session management module and to communicate with the database, the provisioning unit operative to provide facilities for personal configuration, customization, and call flow setup; and
a multimedia message (MM) retrieval unit adapted to communicate with the database and with the interface, the MM retrieval unit operative to retrieve from the database configured call control rules and multimedia data including at least part of the first data and the second data related to the call, and filter the call by applying the call control rules to the multimedia data.

40. A system for managing a call, the system comprising:
means for receiving first data related to a call sent by a calling party to a called party;
means for obtaining from a database, in response to the first data related to the call, second data related to the call, wherein at least one of the first data related to the call, the second data related to the call, and a combination of the first and second data related to the call comprising multimedia data; and means for managing the call based at least in part on the multimedia data, wherein means for managing the call includes means for deriving a subject matter of a content or purpose of the call from multimedia data; and
means for filtering the call by applying call control rules to the subject matter of the call, wherein the subject matter of the call is based on the content or purpose of the call derived from the multimedia data.

41. The method of claim 40, wherein means for managing the call comprises:
means for filtering the call based on a predefined user profile.

42. The method of claim 40, wherein means for managing the call comprises:
means for filtering the call using rules that are dynamically defined.

43. The method of claim 40, wherein the network includes at least one of a PSTN, a packet switched data network and a wireless network and wherein the MPCM server communicates with the network through gateway.

44. The method of claim 43, wherein the gateway includes at least one of a mobile switch, a digital switch, and a soft switch.

* * * * *